United States Patent [19]

Lamoureux et al.

[11] 4,200,868

[45] Apr. 29, 1980

[54] BUFFERED HIGH FREQUENCY PLASMA DISPLAY SYSTEM

[75] Inventors: William R. Lamoureux, Kingston; William J. Martin, Lake Katrine; James B. Trushell, Saugerties, all of N.Y.

[73] Assignee: International Business Machines Corporation, Armonk, N.Y.

[21] Appl. No.: 892,703

[22] Filed: Apr. 3, 1978

[51] Int. Cl.[2] .................................................. G06F 3/14

[52] U.S. Cl. .................................... 340/713; 340/771; 340/758; 340/789; 340/805

[58] Field of Search ............... 340/758, 771, 774, 776, 340/777, 779, 789, 791, 805, 811, 166 EL, 168 S, 713

[56] References Cited

U.S. PATENT DOCUMENTS

| | | | |
|---|---|---|---|
| 3,562,737 | 2/1971 | Wiederhorn et al. | 358/240 |
| 3,681,754 | 8/1972 | Baasch | 340/168 S |
| 3,793,629 | 2/1974 | Sharpless | 340/805 |
| 3,953,762 | 4/1976 | Iwakawa et al. | 340/811 |
| 3,987,337 | 10/1976 | Nishida et al. | 340/777 |
| 4,027,196 | 5/1977 | Criscimagna et al. | 340/771 |

OTHER PUBLICATIONS

*Plasma Display*, Yano et al., Nippon Elec. Co., pp. 54-63.

*Primary Examiner*—Marshall M. Curtis
*Attorney, Agent, or Firm*—Joseph J. Connerton

[57] ABSTRACT

A plasma discharge display device is operated at a high frequency above the response range of the inherent wall charge storage phenomenon and utilizes a refresh buffer. The vertical drive selection includes a pair of shift registers operated in parallel into which data from the host or associated controller is loaded, with an individual driver associated with each register stage. The horizontal lines are addressed through associated shift registers in an even-odd interlace sequence to generate a display on a horizontal scan basis. The horizontal drivers are referenced at the level and frequency of the high frequency energizing signals, while the vertical drivers are selectively set to ground or a positive a.c. voltage according to the state of associated register cells. By using the high frequency signal in the horizontal axis as a floating reference and unique selection techniques, the display is operated by low voltage signals. The normal sustain and erase operations associated with conventional plasma discharge devices are eliminated, while the write operation does not require either the precise timing or logical considerations associated with the selective operation of conventional plasma discharge display devices. The low voltage drive requirements permits use of low voltage driver circuitry which is susceptible to low cost monolithic fabrication techniques.

9 Claims, 4 Drawing Figures

BUFFERED HIGH FREQUENCY PLASMA DISPLAY SYSTEM

BACKGROUND OF THE INVENTION

Conventional a.c. plasma discharge display panels consist of two glass plates upon each of which has been formed an array of parallel conductors over which transparent glass dielectric and secondary emissive coatings have been applied. The plates are assembled with the conductor arrays disposed substantially orthogonal to each other, the inner plate surfaces spaced at a uniform distance designated the discharge gap over the entire surface and perimeter sealed into an envelope which is then evacuated, backfilled with the appropriate gas mixture and permanently sealed. By selective manipulation of the conductor arrays, cells positioned at the intersections are ionized to form a display.

While the manufacturing techniques for fabricating a.c. plasma panels have been developed, they remain relatively expensive to fabricate because of required close tolerances in physical and electrical parameters. Such a.c. plasma panels possess an inherent storage or memory function in which discharge particles, ions and electrons, are alternately attracted to opposite walls of the cells as the polarity of the driving voltage is successively reversed. However, the inherent memory requires that sustain signals be continuously applied to all cells of the panel to repetitively reionize the cells to maintain the display, resulting in relatively complex logic requirements to combine selective write and erase operations with the non-selective sustain. In addition, relatively high voltage write and erase drivers which are not susceptible to economical low voltage monolithic circuit fabrication are required in conventional plasma discharge display devices. Precise write, erase and sustain times are required in normal a.c. plasma operation. Further, certain electrical parameters such as the operating margin, i.e., the difference between the maximum and minimum sustain voltage ($V_s$ max. $-V_s$ min.) are extremely critical, and may vary beyond limits either during or after test, necessitating either rejection or field replacement of the panel with the associated cost involved.

SUMMARY OF THE INVENTION

The instant invention overcomes certain limitations inherent in conventional plasma display panels by operating in what is herein designated as "scan" mode in which the gas panel is operated at very high frequency such that the inherent memory characteristic of the panel is effectively eliminated, requiring a refresh driving method such as that used in conventional CRT display devices. Since the normal use of the invention would be in a display terminal environment associated with a host processor, the host, host interface or display controller is required to provide refresh of the display in the same manner as conventional raster scan CRT displays. In operational terms, the frequency at which the invention is operated may be varied from 500 kilocycles to 2 megacycles, or higher as compared to a normal 50 KC rate for conventional a.c. plasma devices, in which frequency range the wall charge characteristic of the plasma discharge device is eliminated. The invention does not require close tolerances in physical or electrical parameters inherent in conventional plasma displays, while the associated logic is simplified and adapted for integrated circuit packaging. There is no specific time format for a write operation, while the erase and sustain operations together with the margin requirements inherent in conventional plasma panels are completely eliminated. The entire display must be refreshed at a frequency to eliminate or avoid any flicker problems, at least 40 complete scans per second, while the time to load data which tends to reduce display intensity is minimized. The invention permits the use of low voltage drivers, while the logic and driving circuitry are designed for high density integrated circuit packaging. The plasma panel structure utilized with the instant invention can correspond to those used in conventional X-Y matrix addressed plasma display devices including panels which would tend to fail standard testing techniques applicable to matrix addressed plasma panels. The instant invention utilizes a horizontal line scanning technique, such that maximum benefit is provided for displays having a high aspect ratio, i.e., the ratio of vertical to horizontal conductors.

Accordingly, a primary object of the present invention is to provide an improved plasma display system using a scan mode of operation.

A further object of the present invention is to provide an improved plasma display system operating in a high frequency scan and refresh modes of operation.

Another object of the present invention is to provide a low cost plasma display system which provides selective write operations, while eliminating the sustain and erase operations associated with conventional matrix addressed plasma display panels.

Still another object of the instant invention is to provide an improved plasma display device in which the drive logic and selection circuitry are designed for low voltage circuitry and susceptible to economical integrated circuit packaging.

DESCRIPTION OF THE PREFERRED EMBODIMENT

Figure 1:
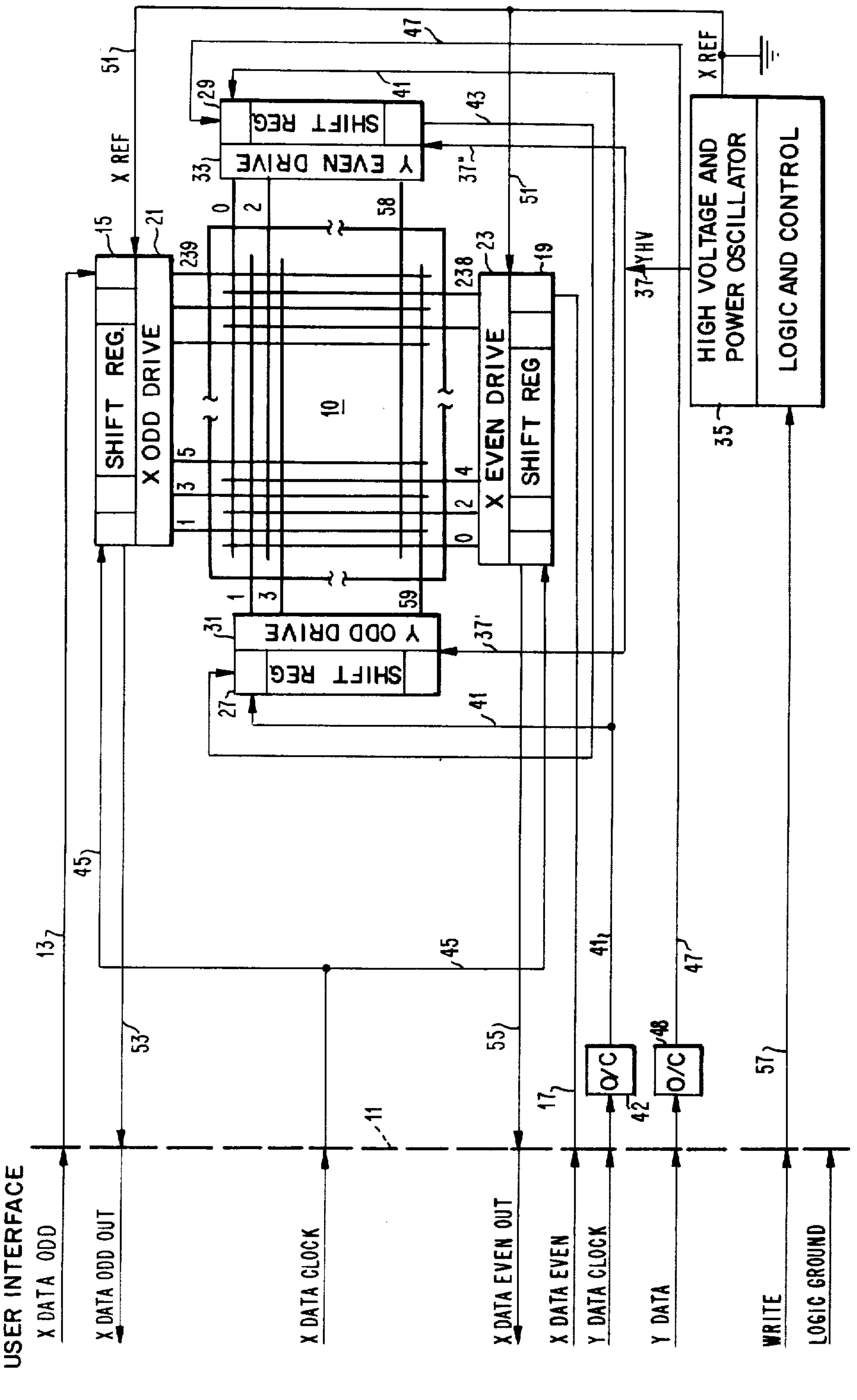
FIG. 1 is a block logic diagram of a preferred embodiment of the instant invention.

Referring now to the drawings and more particularly to FIG. 1 thereof, the instant invention will be described in terms of a preferred plasma display system including panel assembly 10 having 60 horizontal lines labeled Y0–Y59 and 240 vertical lines labeled X0–X239, the lines being divided into groups of odd or even lines, both the vertical and horizontal line groups being driven from opposite sides of the panel. Such a configuration could provide a six line 40 character per line display or 240 5×7 dot characters. The horizontal lines are driven by groups in an interlaced pattern similar to conventional TV displays, while the vertical lines X0–X239 are conditioned by their associated shift register stages and driven or scanned simultaneously on a horizontal line by line basis. It should be noted that using the basic scan technique, all of the dot or line segments must be continuously refreshed by the host or through an associated buffer. Such techniques are well known in the display terminal art, and such details have accordingly been omitted from the instant application.

The panel assembly 10 and associated drive and control circuitry are shown to the right of line 11, which is used to illustrate the separation of the User Interface from the panel assembly. The user interface of the preferred embodiment consists of nine control lines including a logic ground which are labeled by function. The vertical input lines are designated by X DATA ODD and X DATA EVEN inputs, while the horizontal lines are divided into two interlaced groups designated Y DATA ODD and Y DATA EVEN. Serial data comprising the odd X image data will be loaded to the top vertical drivers with a data sequence of high order (X1) bit first. The even X image data, which is presented in parallel with the odd X image data, will be loaded to the bottom vertical drivers with a data sequence of high order (X0) bit first. Logic control lines in the User Interface will be assumed to originate from the host or display controller, both of which are well known in the art, the details of which are beyond the scope of and unnecessary for an understanding of the instant invention.

The panel assembly 10 illustrated in the preferred embodiment of FIG. 1 is an APA (All Points Addressable) device in which the display cells, located between the orthogonal conductor arrays disposed on opposite sides of the panel, are individually and selectively addressable. Refresh is provided on a horizontal scan basis by accessing the host or controller using conventional refresh techniques. Both the horizontal and vertical conductors are divided into alternate groups of odd and even lines, the odd line groups being driven from one side of the panel, the even line groups being driven from the opposite side. Two parallel data load paths for the X axis, X DATA ODD and X DATA EVEN, are provided in order to reduce load time, while, as previously noted, the X odd and X even data are presented in parallel. The ratio of the load time to the display time in a refresh driven display affects the display intensity, so that it is desirable to minimize the load time portion of a display sequence. Accordingly, the X Odd and X Even shift registers 15 and 19 are loaded in parallel at a high data rate from the respective X DATA ODD and X DATA EVEN lines 13 and 17 respectively. This design allows flexibility in programming character row positioning, character size and character font through manipulation of the horizontal address data. The horizontal clock line 45 labeled X Data Clock shifts this data through the horizontal shift registers in such manner that the even and odd lines are scanned sequentially in an interlace technique. Serial data on line 47 is loaded to the Y drivers to latch the addressed horizontal scan lines. Y address sequencing is Y0, Y2, Y4 . . . Y58 followed by Y1, Y3, Y5 . . . Y59. Data to Y0 is a logical "1" to latch the Y0 scan line. All subsequent data to Y are logical "0"'s through Y59 to cause precession of the logical "1" through all horizontal addresses. Only one logical "1" in the Y axis is permissible at any time. Shift registers 15 and 19 associated with X Odd Drive 21 and the X Even Drive 23 respectively include an individual shift register cell associated with each of the drive lines, each cell in turn being controlled by the binary state of its associated shift register stage. Thus each of shift registers 15 and 19 include 120 cells associated with the respective 120 odd and 120 even vertical lines. Basically, the operation of the device entails setting the selected X Odd and X Even lines at ground reference through their respective cells, and applying a burst of high frequency signals comprising sinusoidal voltages of 220 volts peak-to-peak to all Y lines. An additional write signal of +25 volts is applied sequentially to the Y even lines and then the Y odd lines, and the cells located at the intersection of the selected X and Y lines and receiving the 245 volt potential will be ionized.

The Y axis also includes shift registers 27 and 29 and their associated odd and even drivers 31 and 33 respectively, one driver for each line. Each Y drive is referenced to the high frequency sinusoid from high voltage and power oscillator 35, which is connected through line 37, 37' and 37'' to the respective Y Odd and Even Drives 31 and 33. To avoid the problem of high voltage shifting, the high frequency signal is applied directly to all odd and even lines, so that effectively all Y lines have a 220 volt potential thereon, a voltage level insufficient to ionize a cell. As described above, the Y even shift register 29 has a "one" bit applied from Y data line 47 in the User Interface to the zero stage of the Y even shift register 29, the "one" bit serving to identify the selected Y line during each write cycle. The selected Y even drive 33 utilizes the high frequency sinusoid signal as a reference, and applies an additional pulse of 25 volts to the selected Y line which, combined with the 220 volt high frequency reference, provides a potential of 245 volts across selected cells, which is adequate to ionize those cells wherein the X select level is set at ground as previously described. Writing is done by horizontal scanning of the Y lines in an interlaced mode as shown, in which the one bit is shifted through the 30 even stages of shift register 29. The output stage 58 of even shift register 29 is connected via line 43 to the input stage of the odd shift register 27, and is then shifted through the 30 stages of the odd shift register in the identical manner as in the even shift register, thereby completing one interlaced horizontal scan sequence.

Shifting of the X odd and X even shift registers 15, 19 is provided by the shift signal on line 45 which originates from the X Data Clock in the User Interface, while shifting for the Y shift registers is provided by the Y data clock signal on line 41 also originating in the User Interface. Due to the difference in signal levels between the control signals in the User Interface and the high frequency drive signals, optical couplers 42, 48 provide coupling and isolation between the two different levels for the Y Data and Y Data Clock signals. The Y scanning sequence utilizes the interlace technique in which scanning of all the even lines 0 through 58 is followed by scanning of the odd lines 1 through 59. This interlace sequence effectively improves the intensity and prevents any flicker problem which could result if the lines were scanned sequentially on a non-interlace basis.

Operating at 3 MHz using a 1.5 MHz sinusoid, for example, the write period per line is approximately 400 microseconds, while the load time for loading the X odd and X even shift registers is approximately 40 microseconds operating at a frequency of 8 MHz. The X reference signals are effectively referenced at ground level for the selected vertical lines, or at 25 volts a.c. for the deselected lines. The output from the X shift registers 15, 19 on lines 53 and 55, returned to the User Interface on lines labeled X Data Odd Out and X Data Even Out, are not functionally required but are used for diagnostic purposes. The write line on line 57, also originating in the User Interface, is applied to logic and control circuit 35 to initiate the write cycle heretofore described, while the logic ground control line shown at the User Interface merely provides a ground reference for the logic circuitry. Write is a command signal causing the latched drivers in X and Y to be driven and the associated image data written to the panel. Write is held active for the duration of the write cycle for a scan line, 516 microseconds, a period determined by the time/intensity requirements in the interlace operation of the instant invention. Write logically triggers an a.c. drive which maintains driving potential on all selected X/Y drivers.

Figure 2:
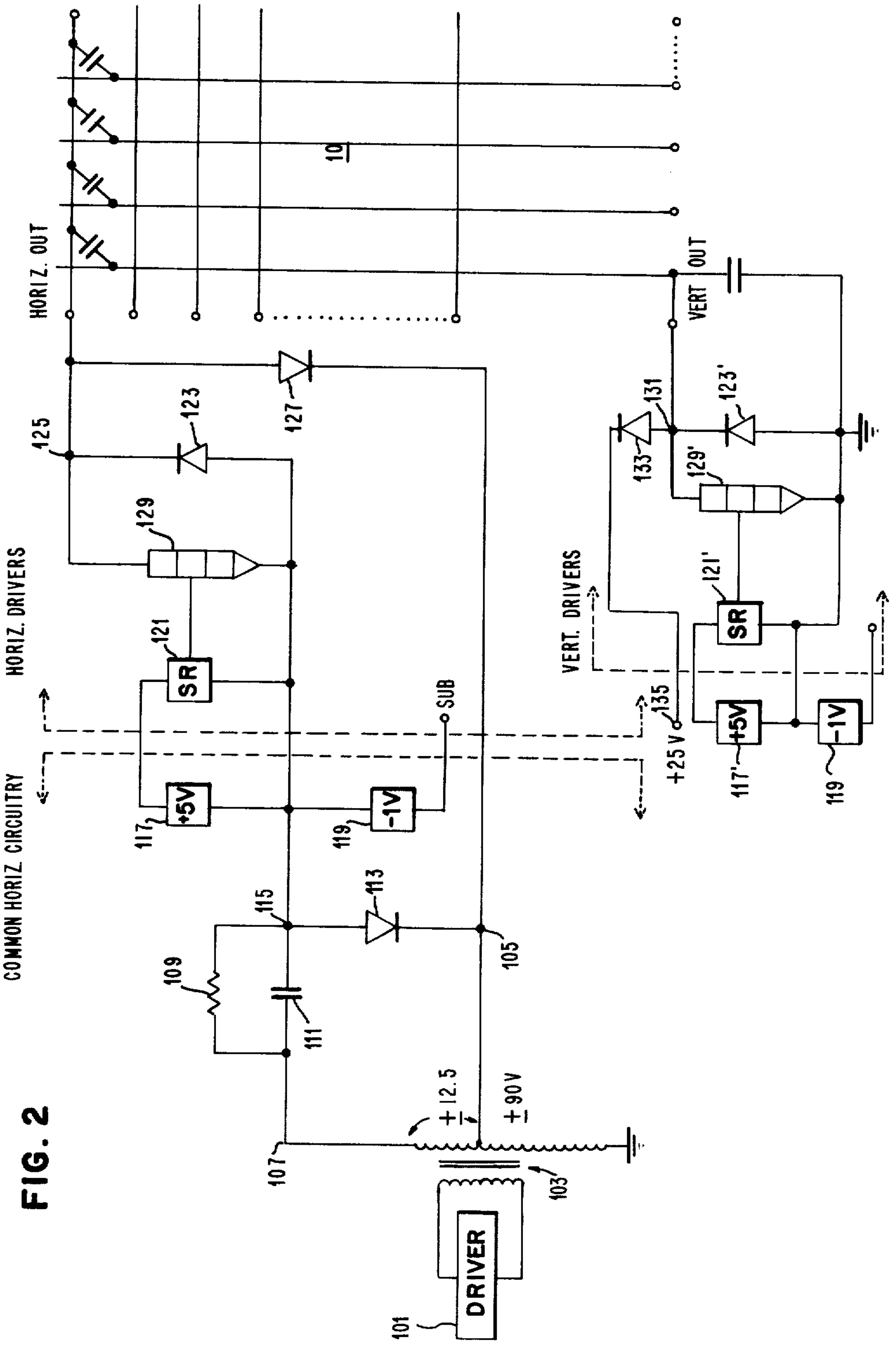
FIG. 2 is a block schematic diagram of a preferred embodiment of the instant invention.

While the invention has been broadly described with reference to the block diagram of FIG. 1, a more detailed block schematic of the invention is illustrated in FIG. 2. Referring now to FIG. 2, there is illustrated a simplified schematic of the scan panel system. The primary purpose of the horizontal and vertical drivers is to increase the peak-to-peak voltage across each capacitive element (cell) by about 50 volts, which in turn accomplishes selection. This is provided in the instant invention, however, utilizing low voltage circuits not exceeding 25 volts. High frequency driver 101 is connected to the primary winding of a transformer 103 which develops 180 volts peak-to-peak at node 105, using a portion of the secondary winding, and 205 volts peak-to-peak using the full secondary winding of transformer 103 at node 107. Resistor 109, capacitor 111 and diode 113 comprise a voltage doubler circuit which causes node 115 to reach a maximum negative potential of 25 volts, neglecting diode drops, with respect to node 105. The +5 volt and −1 volt power supplies 117 and 119 respectively for the horizontal modules float on the node 115 potential; further, optical couplers 42, 48 (FIG. 1) provide the Y clock and data signals to the horizontal modules as more fully described hereinafter. The −1 volt power supply 119 references the chip substrate at −1 volt. The above described circuitry is the common horizontal circuitry for generating and applying the Y drive to the selected lines. Individual horizontal driver circuitry is associated with each of the lines i.e., is duplicated for each horizontal drive line.

Figure 3:
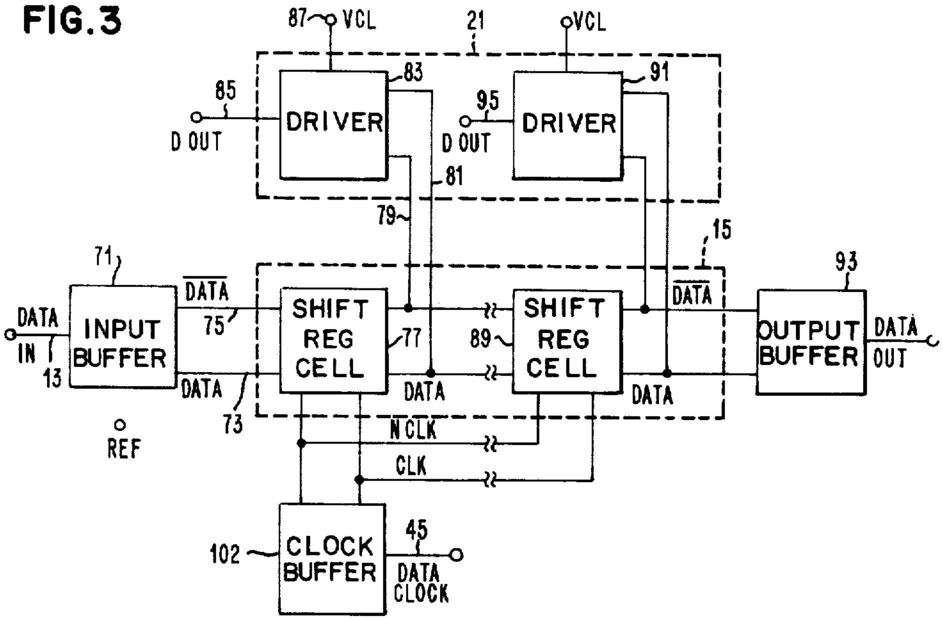
FIG. 3 is a block representation of a vertical selection and drive module.

In operation, the data is propogated serially through the shift register cell 121, which may be packaged in monolithic circuitry, and then to other serially connected modules as described with respect to FIG. 3, depending on display size. Once the data is turned on, and full voltages are applied to the driver modules. This prevents all BVCEO breakdown of the drivers which would occur if the drivers were required to switch the required increment in peak-to-peak voltage (about 250 volts). Operation of the vertical drivers is similar and the components are similarly identified with a prime designation, except that the optical couplers are not required, and the clock frequency is higher since there are more vertical lines which must be loaded in the same time interval. Horizontal clock frequency is about 200 KHz, whereas vertical clock frequency is about 5 MHz. It should be noted that the display intensity varies as a function of the frequency of the transformer driver 101, and the maximum frequency is about 1.5 MHz. When the horizontal driver 101 is off, diode 123 sources current to the output node 125, while diode 127 sinks current from the same node. When the horizontal driver is on, an additional 25 volts in the negative direction is applied to node 125, since the output node 125 is essentially connected to the voltage doubler buss at node 115 through transistor 129 and diode 123. When the vertical driver is off, diode 123 clamps output node 131 to ground, while diode 133 clamps node 131 to about +25 volts originating at voltage source 135. With the vertical driver on, output node 131 is held to ground. As a consequence, activation of either the vertical or horizontal driver causes an additional 25 volts to occur across the selected cells. Coincidence of both vertical and horizontal selection places an additional 50 volts across the selected cells which cause the selected cells to avalanche. For a large plasma display panel, a peak current of about 20 milliamps must be sourced and sinked by the horizontal drivers. Because of the 50% duty cycle, the 20 m.a. peak corresponds to about 7 m.a. RMS; consequently, 10 m.a. devices can be used for diodes 123, 127 and possibly transistor 129. The vertical current demand is considerably less. The details of the specific drive circuits utilized for the horizontal and vertical drivers are shown and described with respect to FIG. 4.

Figure 4:
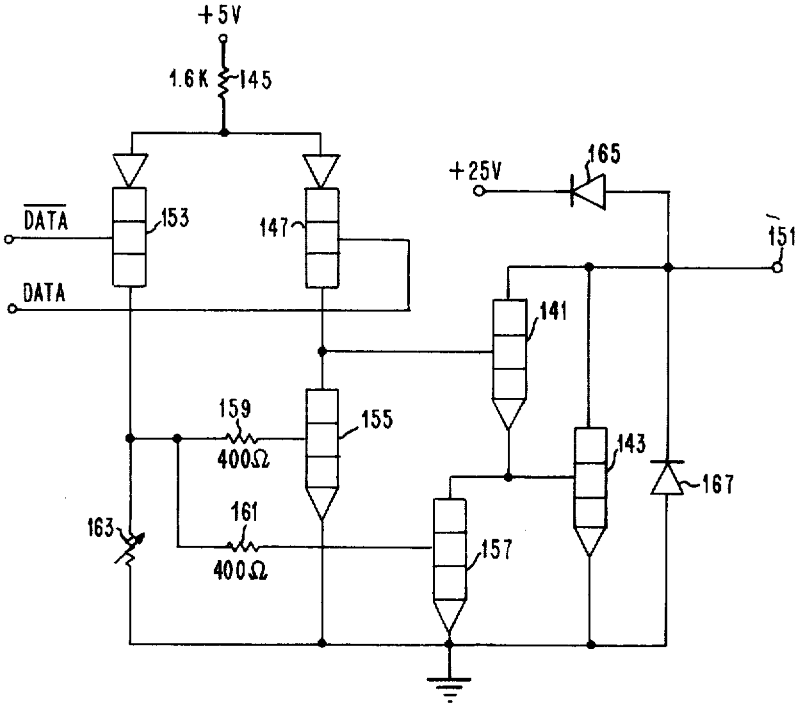
FIG. 4 is a schematic diagram of the horizontal driver configuration.

Referring now to FIG. 3, there is illustrated in block schematic form a single module of the X Odd Shift Register 15 and associated X Odd Drive 21, noting that the X Even Drive 23 and associated X Even Shift Register 19 are identical both in structure and operation. The circuitry shown in FIGS. 2–4 is adapted for integrated circuit packaging, each module including a plurality of circuits, although obviously discrete components could be employed. While the number of circuits per module varies as the packaging technology employed, the circuitry utilized in the preferred embodiment was packaged in groups of 16 shift register stages and associated drivers, plus an input buffer and an output buffer for each module. A number of such modules are interconnected in accordance with the size of the display to be provided, so that the horizontal modules can be considered as one large serial shift register with parallel output drivers, one driver per bit or per cell. The specific circuit implementation of the drivers are shown and described in detail hereinafter.

Assuming the module represents the first 16 bits of the X shift register and associated drive, the X Data Odd Line 13 designated DATA In is connected to input buffer 71, which generates two outputs, an output on line 73 designated DATA indicating the presence of positive data or a binary 1 condition on the data input, an output on line 75 designated $\overline{\text{DATA}}$ indicating the absence of data or a binary 0 condition. The outputs 73 and 75 are connected to the first stage of shift register 15 shown as shift register cell 77, the DATA and $\overline{\text{DATA}}$ outputs of which are connected via lines 81 and 79 to the associated driver 83 of X Odd Drive 21, which produces an output on line 85, which output is normally applied as a drive signal to its associated panel drive line. Each shift register module essentially comprises a series of triggers which are logically interconnected to form a shift register in a manner well known to those skilled in the art. In the configuration shown in FIG. 3, only the first and sixteenth stages, cells 77, 89 of the shift register and their associated drivers 83, 91 are illustrated by way of example, all interconnecting shift register and driver stages being identical. The output 85 from driver 83 designated D OUT represents output drive line X1 from the X Odd Drive 21, (FIG. 1), and each driver stage has an associated reference level VCL of +25 volts such as output terminal 87. The +25 volts represents a clamp voltage which prevents the output from exceeding 25 volts damaging the module. The individual stages of the shift register are coupled together in successive pairs to transfer information from the first stage to the last, and when filled, the one or zero condition of the respective stages produces a ground reference or a 25 volt a.c. potential applied to each of the stages such that the select or write signal from the Y drivers either selects or deselects individual cells on the select line in accordance with the contents of the X shift register.

Since the devices are packaged in a series of modules, each module includes an input and an output buffer to drive the succeeding module to maintain the prescribed signal level as signals are sequenced or propogated through the entire shift register. Utilizing a 16 circuit per module packaging arrangement as described, a total of 15 modules would be required to drive 240 X vertical lines, one of the modules being shared by eight odd and eight even shift register and driver circuits. This sharing arrangement would obviously be utilized only if more convenient than utilizing eight shift registers for odd and even respectively.

Referring now to FIG. 4, there is illustrated a circuit schematic of the horizontal driver shown in block schematic form in FIGS. 1-3. In the preferred embodiment, FIG. 4 is an off-chip driver whose inputs are the true and complement outputs of the associated shift register cell marked DATA and $\overline{DATA}$ and whose output will sink current through transistors 141 and 143 to ground when data is positive with respect to $\overline{DATA}$. Examination of both vertical and horizontal circuit requirements reveals that the same circuit can be used for both functions, providing the additional output capacitance of the larger horizontal output devices can be tolerated in the vertical function, since too large an output capacitance could prevent the 25 volt clamp from operating.

The average value of DATA and $\overline{DATA}$ is positive, so that a current of approximately 250 microamps always flows through the resistor 145 when DATA is positive with respect to $\overline{DATA}$, and this current is diverted through transistor 141. This current flows into the base, turning transistor 141 on. Current through transistor 141 also turns on transistors 141 and 143 in this stage which are interconnected in a conventional Darlington coupled transistor pair configuration, which is particularly suitable for monolithic fabrication. The current gain with respect to output node 151 is the product of the current gains of devices 141 and 143.

When $\overline{DATA}$ is positive with respect to DATA, the 250 microamps is diverted through transistor 153. The collector of transistor 153 rises, and current is driven into the bases of transistors 155 and 157 through resistors 159 and 161 respectively. Devices 155 and 157 pull down the bases of transistors 141 and 143 to ground, presenting a low base impedance for devices 141 and 143 respectively. The low base impedance is important because the breakdown voltage required is the open emitter breakdown voltage, as opposed to the open base breakdown voltage.

Variable resistor 163 comes into operation when the DATA and $\overline{DATA}$ nodes are reversed in sense or polarity. Resistor 163 functions to hold transistors 155 and 157 off during the on condition of the driver. It is a further system requirement that the output driver be protected from breakdown condition, and diode 165 is provided for this function. In the event that the driver is driven from the load to a potential more positive than its specified breakdown of 25 volts, diode 165 will conduct, preventing the breakdown condition from happening. Also in the preferred embodiment of the instant invention, it is required that the device be able to source current from ground. This requirement is met through diode 167.

The above described circuit configuration is a circuit with enough drive to handle horizontal lines on fairly large panels. For lower load vertical drivers as in the preferred embodiment, the circuit can be simplified. Instead of a Darlington configuration using transistors 141 and 143, transistors 143 and 157 can be eliminated, and the emitter of transistor 141 connected to ground. With this simplication, the off-chip driver provides only about one-fifth to one-tenth the drive current as compared to the Darlington implementation, which current requirement is adequate for the vertical drivers in the preferred embodiment.

The above described invention thus provides a novel method of operating a plasma display with low voltage driving circuitry, non-complex selection and drive circuit adapted for generating a display using a scanning technique. The structure and techniques used therein are well developed in the display art, so that the overall cost and complexity of such displays is substantially reduced. Further, by eliminating certain operational parameters associated with conventional a.c. plasma display devices, panels which do not operate within these parameters may be employed in the present invention.

While we have illustrated and described the preferred embodiments of our invention, it is to be understood that we do not limit ourselves to the precise constructions herein disclosed and the right is reserved to all changes and modifications coming within the scope of the invention as defined in the appended claims.

Having thus described our invention, what we claim as new, and desire to secure by Letters Patent is:

1. A refresh buffer plasma display system comprising in combination, a plasma display device comprising first and second glass plates, said plates being sealed under pressure and containing an ionizable gas, said first and second plates having first and second dielectric coated arrays of parallel conductors respectively formed thereon, said first and second conductor arrays being orthogonally disposed with respect to each other whereby the intersections of said orthogonal conductors define a matrix of gaseous discharge cells, a high frequency signal source having a repetition rate above the wall charge response time of said gaseous discharge cells to prevent the accumulation of wall charge on said cells during operation of said device, first and second drive-selection circuits associated with said first and second conductor arrays, means responsive to control signals applied to said first drive-selection circuits for selectively conditioning conductors on one of said arrays in response to data signals applied thereto, and means responsive to control signals applied to said second drive-selection circuits for selectively and sequentially scanning a plurality of conductors in said second array with said high frequency signal source and applying drive signals referenced to said high frequency signal source to selected lines whereby selected cells in said array are ionized by coincidence of said conditioning and said scanning signals.

2. A system of the type claimed in claim 1 wherein said high frequency signal is applied to all conductors on one of said arrays.

3. A system of the type claimed in claim 1 wherein said first and second selection circuits comprise vertical and horizontal selection circuits respectively.

4. A system of the type claimed in claim 1 wherein said conditioning means is applied to said vertical axis and said scanning means is applied to said horizontal axis.

5. A system of the type claimed in claim 3 wherein said vertical selection circuits comprise interleaved shift registers connected to conductors alternately terminated on opposite sides of the panel.

6. A system of the type claimed in claim 3 wherein said horizontal selection circuits comprise serially connected interlaced shift registers operated as a ring counter for providing an interlaced display.

7. A system of the type claimed in claim 5 wherein said vertical shift registers are loaded and operated in parallel to reduce data load time.

8. A device of the type claimed in claim 3 wherein said first drive-selection circuits apply a pulse signal to selected vertical lines while a similar signal referenced to said high frequency signal is applied to said horizontal conductors whereby a horizontal slice of data is simultaneously generated for display.

9. A device of the character claimed in claim 8 wherein said horizontal and vertical drive-selection circuits include shift register means for entering and shifting data to control the operation of drivers associated with each row and column in said matrix display.

* * * * *